April 1, 1930. S. OLSON 1,752,540
AUTOMATIC COUNTING AND GROUPING MECHANISM FOR CONVEYERS
Filed Nov. 2, 1927   2 Sheets-Sheet 1

Inventor:
Samuel Olson.
By
Attys.

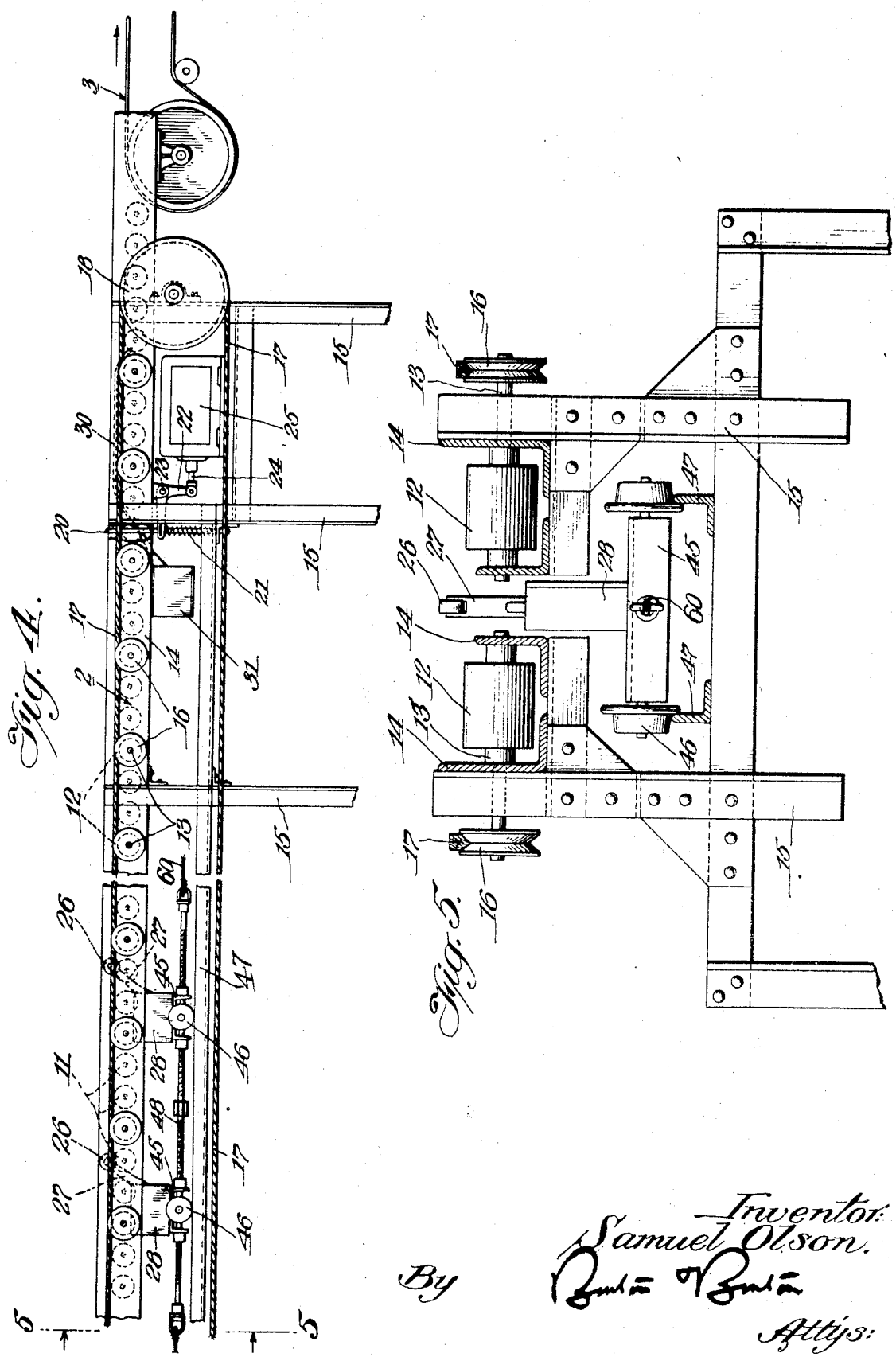

Patented Apr. 1, 1930

1,752,540

UNITED STATES PATENT OFFICE

SAMUEL OLSON, OF OAK PARK, ILLINOIS, ASSIGNOR TO SAMUEL OLSON & COMPANY, OF CHICAGO, ILLINOIS, A CORPORATION OF ILLINOIS

AUTOMATIC COUNTING AND GROUPING MECHANISM FOR CONVEYERS

Application filed November 2, 1927. Serial No. 230,577.

This invention relates to conveying apparatus for loads, such as packages, boxes and various parcels, and has for its object to provide an automatically actuated mechanism for counting the loads transported thereby. Another object is to provide a mechanism for grouping a predetermined number of successive loads carried on the conveyer. A further object is to provide adjustment of the mechanism to accommodate it for grouping loads in different numbers, and for grouping various sizes of loads. It consists in certain features and elements of construction in combination, as herein shown and described and as indicated by the claims.

In the drawings:

Figure 4 is an enlarged view in side elevation of the conveyer provided with the counting and grouping mechanism.

Figure 5 is a vertical transverse section through the conveyer illustrated in Figure 4, showing in end view one of the movable switch devices of the mechanism, being taken as indicated at line 5—5, on Figure 4.

Figure 1:
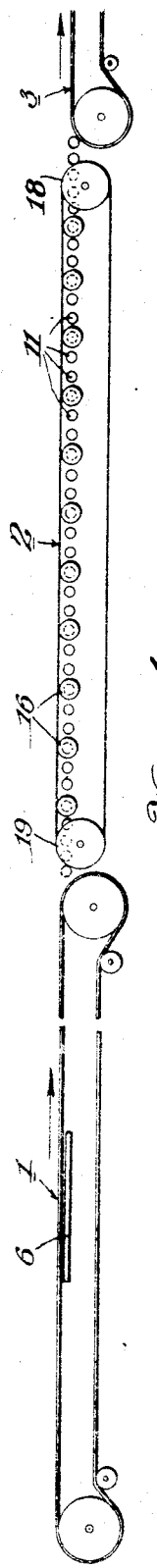
Figure 1 is a diagrammatic view in side elevation of a conveying apparatus embodying the present invention.
Figure 2:
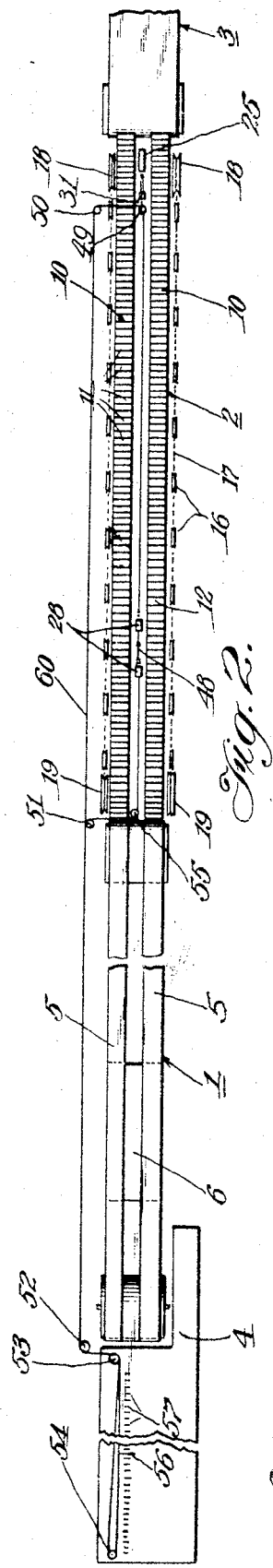
Figure 2 is a diagrammatic plan view of the conveying apparatus shown in Figure 1.

Referring now to the drawings, it will be seen that the present invention is illustrated in connection with a system of conveyers in which 1, indicates in general a loading and timing conveyer for feeding onto an intermediate conveyer, 2, which is provided with the automatic counting and grouping mechanism as will hereinafter be described. Arranged at the discharge end of the intermediate conveyer is a belt conveyer, 3, for receiving and transporting the loads to suitable points of discharge. A loading platform indicated at 4, is shown adjacent the foot end of the belt conveyer 1, but it will be understood that this conveyer may be mechanically loaded by other conveyers or by machines such as packaging and sealing machines of a usual type. The belt conveyer, 1, includes a pair of transversely spaced tapes, 5, or narrow belts, and a co-operating timing mechanism, the location of which is indicated diagrammatically at 6, forward of the loading point of the conveyer. This timing mechanism may be of a type similar to that illustrated in my co-pending application, Serial Number 198,081, filed June 11, 1927, for securing proper spacing of the loads on the conveyer for feeding to the intermediate conveyer, 2. The timing mechanism is designed so that the loads on the conveyer, 1, will preferably be spaced at intervals of considerably more than the length of the maximum size load or package to be handled.

In many manufacturing establishments the various articles of merchandise are "put up" in suitable boxes, cartons or containers, and frequently large quantities of these various articles of the same size are handled as an order for shipment or for storage and similar purposes, which could be conveniently transported by a conveying system, as shown in the drawings, to the desired points of disposal. When large quantities of articles of a uniform size are to be moved as a lot, either as an order or for storage purposes, it is desirable to be able to ascertain quickly the number of articles comprising the lot and segregate them from the others. This is accomplished by grouping a predetermined number of articles as a unit, by my automatic counting and grouping mechanism herein described. This grouping facilitates handling and makes it easy to keep records. The number of articles comprised in each group may be varied as desired. Unit grouping of the articles also simplifies the final packing and crating and enables the quantities to be accurately determined, as well as saving considerable time when a unit group may be loaded onto a truck or dolly for movement from place to place.

The intermediate conveyer, 2, (with which the counting and grouping mechanism operates) includes a pair of transversely spaced conveying elements, 10, each comprising a plurality of "gravity" rollers, 11, with live or power rollers, 12, spaced at suitable intervals. These rollers are mounted on shafts, 13, journaled in a pair of inwardly facing structural angle members, 14, which are secured to the structural framing, 15, of the conveyer. The outer end of the shaft of each live roller, 12, extends through the angle member, 14, and is provided with a sheave, 16, adapted to be driven by a V-belt, 17, which is trained over head and foot wheels, 18 and 19, respectively. The spacing of the live rollers, of course should correspond to the length of the shortest article or load handled by the conveyers.

A vertically disposed stop member, 20, is positioned adjacent the discharge end and between the conveying elements, 10, and is normally held in the path of travel of articles or loads on the conveyer by a coil spring, 21, encasing the stop member and abutting against the framing, 15. A bell crank lever, 22, is pivoted to the framing at 23, and has one arm slidably engaged with the stop member, 20, while the other arm is pivoted to the end of the armature or core, 24, of an electromagnet, or solenoid, 25, supported on the framing, 15. This stop member is adapted to arrest a predetermined number of successive loads on the conveyer elements, 10, and group them as a unit, the last two loads of the unit registering over and engaging rollers, 26, on the ends of lever arms, 27, operating a pair of longitudinally spaced switches, 28, to close an electric-circuit and energize the solenoid, 25, whereupon the bell crank, 22, draws the stop member, 20, downwardly permitting the group of loads collected and held by said stop to again be set in motion in a forward direction on the conveying elements, 10, as a single unit. It will be apparent from the diagram in Figure 3 that the switches, 28, are connected in series; hence there must be enough loads grouped on the conveyer to close both switches in order to complete the circuit to retract the stop, 20, by means of solenoid, 25. The switches, 28, are of a type commonly termed "limit switches" and illustrated in detail in my Patent Number 1,645,619, of October 18, 1927, and they are positioned with their rollers and arms projecting upwardly between the conveying elements, 10, in the path of travel of loads, and yieldingly maintained in such position. It is clear that immediately upon the forward movement of the unit group of loads, the last load frees the arm and roller of the last switch, 28, which breaks the circuit and would, if permitted, cause the solenoid to free the stop, 20, which would be apt to strike a load in midsection or arrest some of the loads of the unit group. But such release of the stop by the solenoid during the movement of a complete unit of loads is prevented because the first load of the unit group immediately after being freed by the stop encounters a lever arm, 30, which extends in the direction of travel of the conveyer and which normally is held up yieldingly in the path of travel of loads on the conveyer. The first load forces this lever, 30, downwardly to close a switch, 31, mounted on the framing, 15, whereby to complete a second electrical circuit including the solenoid, 25, to keep the same energized, and the stop retracted until the last load of the unit group passes the stop, 20, and frees the lever arm, 30, permitting the switch, 31, to open, thus finally breaking the solenoid circuit. This releases the solenoid and allows the stop to be forced up into operating position by its spring, 21.

Figure 3:
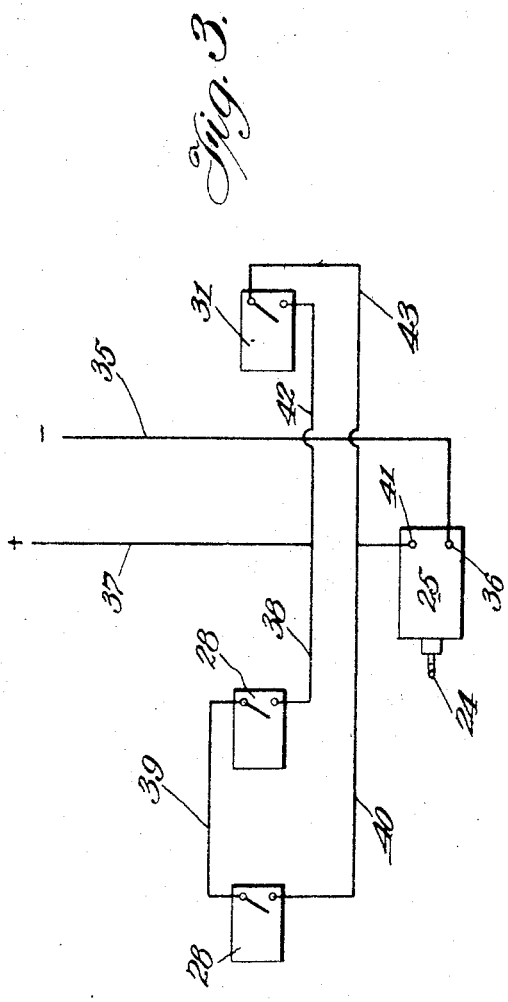
Figure 3 is an electrical wiring diagram for the counting and grouping mechanism.

As shown in Figure 3, one of the power lines, 35, is directly connected to the solenoid, 25, at terminal, 36, while the other power line, 37, connects a conductor, 38, to one of the pair of normally open switches, 28, which are connected together in series by a conductor, 39. From the other switch, 28, a conductor, 40, extends to the terminal, 41, on the solenoid. Thus, it is clear that both switches, 28, must be closed to actuate the solenoid. The second circuit for operating the solenoid includes a conductor, 42, connecting the power line, 37, to the normally open switch, 31, and a conductor, 43, connecting said switch to the terminal, 41, of the solenoid. It will be understood that the second circuit for energizing the solenoid is closed by the first load of the unit group before either of the switches, 28, is opened to break the first circuit.

The switches, 28, are mounted on carriages, 45, carried on rollers, 46, guided on angle rails, 47, which are secured to the framing, 15. A longitudinally extending take-up rod, 48, engages the carriages of the switches, and is adapted to be threaded therethrough for adjusting said switches toward and from each other to accommodate the various size articles or loads carried on the conveyer. These switches, 28, must be spaced apart a distance at least more than the length of the article or load that is transported, in order that a single load will not engage both switch arms, 27, at the same time, which would cause the circuit to be closed for retracting the stop, 20, and releasing the loads already accumulated which would render the grouping as a unit and counting of loads unreliable. It is clear that the use of a single switch, 28, would not permit grouping of loads in units, because each load on the conveyer would operate the switch to close the solenoid circuit, retracting the stop, 20, only until the load passed beyond and again released the switch, 28, to break the circuit which of course would allow an uncertain number of loads collected against the stop, to continue as a unit. It will be understood that when all but the last load of a group have collected on the conveyer against the stop the switch arm of one of the switches, 28, will be depressed to close it, but the solenoid circuit will not be closed to release the group as a unit until the last load of the group becomes arrested and operates to close the second switch, 28.

The number and size of the articles or loads vary with the different shipments, and it is therefore desirable to adjust the switches, 28, relative to the stop, 20, as well as toward and from each other. This adjustment of the pair of switches toward and from the stop is accomplished by a cable, 60, connected to the forward end of rod, 48, then trained over horizontal sheaves, 49, 50 and 51, extending parallel to the conveyer and thence over sheaves, 52, 53 and 54 at the loading end of conveyer, 1; thence back to a lower set of sheaves (not shown) but aligned below sheaves, 53, 52, 51 and then around sheave, 55, and connected to the rear end of rod, 48. The portion of the cable intermediate sheaves, 53 and 54, is provided with an indicator, 56, of any suitable type, adapted to be registered at various points with a graduate scale indicated at 57, on the platform, 4, whereby the movement of the switches, relative to the stop, 20, by the cable, 60, may be adjusted to accommodate the variation in number of loads for grouping as a unit, by an operator at the loading platform. As for example, when an odd number of loads comprises the lot, such as, 78, the cable may be manipulated by the operator to adjust the switches, 28, to any suitable size group, as 5, 10, 15, etc., and when the last remaining number of loads or packages is less than a full unit group, the switches may be again adjusted so that the remainder of the lot will be grouped as a unit and permitted to be released by the stop to join the other units to comprise the lot.

I claim:

1. In combination with a conveyer, automatically actuated means positioned for arresting the movement of a predetermined number of successive loads on the conveyer for grouping the same, and means operable in corelation with said arresting means for releasing said group of loads for continued movement as a unit.

2. In the combination defined in claim 1, said arresting means and releasing means being arranged for automatic resetting after the group of loads passes therebeyond.

3. In combination with a conveyer, automatic means positioned in the path of travel of loads on the conveyer, and adapted to arrest in a group a predetermined number of successive loads, and means actuated by the last load of each group for initiating the release of the group for continued conveyance as a single unit.

4. In the combination defined in claim 3, automatic means, independent of said release initiating means, operable by the loads contacting therewith for releasing the entire group.

5. In combination with a conveyer, electrically actuated means co-operating with the conveyer comprising a solenoid with a stop arranged in the path of travel of loads on said conveyer for arresting them, co-operating switch means adapted to be closed by the loads, when a predetermined number have been assembled against the stop, whereby to actuate said solenoid and release the stop to permit the group of loads to proceed as a unit.

6. In combination with a conveyer, comprising a pair of transversely spaced conveying elements, electrically operated means including a solenoid and a stop positioned between said elements and in the path of travel of loads on the conveyer, switch means positioned to be operated by a load of the group when a predetermined number of loads have accumulated against the stop, whereby to close the electrical circuit to actuate the solenoid, releasing the stop and initiating the movement of the group of loads on the conveyer as a unit, and a switch connected with the solenoid in a separate circuit and positioned to be actuated by the first load of the group as it is released from the stop, whereby to maintain said solenoid with the stop in release position until all the loads of the group have passed thereover.

7. In the combination defined in claim 5, said switch means comprising a pair of switches connected in series and longitudinally spaced in the path of the loads for engagement thereby.

8. In the combination defined in claim 5, said switch means comprising a pair of switches connected in series and longitudinally spaced in the path of the loads for engagement thereby, said switches being adjustable toward and from each other.

9. In the combination defined in claim 5, said switch means comprising a pair of switches connected in series and longitudinally spaced in the path of the loads for engagement thereby, the distance between said switches being more than the length of a load.

10. In the combination defined in claim 5, said switch means comprising a pair of switches connected in series and longitudinally spaced in the path of the loads for engagement thereby, said switches being adjustable together, toward and from the stop, for altering the number of loads in each group.

11. In the combination defined in claim 6, said first mentioned switch means including a pair of co-operating switches arranged in the path of the loads for engagement thereby, and adjustable relative to each other, and spaced apart more than the length of a load, said switches being adjustable together toward and from the stop for determining the number of loads in a group.

12. In combination with a conveyer adapted to frictionally convey loads, means positioned for intercepting a predetermined number of the successive loads and arresting the same in a group against the reaction of the frictional contact of the loads with the conveyer, said means being electro-magnetically operated upon assembly of the predetermined number of loads for releasing said group of loads and permitting their continued movement on the conveyer as a unit.

13. In combination with a conveyer, automatically actuated means positioned for arresting the movement of loads therein without cessation of the load-propelling force, whereby a number of successive loads will accumulate in a group, and means for releasing such loads as a group as soon as a predetermined number of loads have so accumulated.

14. In combination with a conveyer, automatic stop means positioned in the path of travel of loads for arresting them to accumulate a group of a predetermined number of successive loads, together with means positioned to be actuated by the last load of the group for releasing the group as a unit, and means for varying the distance between the stop and such release means at will to alter the size of the group.

15. In combination with a conveyer, an automatic stop positioned in the path of travel of loads thereon for arresting a number of successive loads to form a group, automatic starting means positioned for actuation by the last load of the group for initiating further movement of the group as a unit, and means for adjusting one of said automatic devices along the path of travel of the loads for varying the size of the group at will.

In testimony whereof I have hereunto set my hand this 29th day of October, A. D. 1927, at Chicago, Illinois.

SAMUEL OLSON.